United States Patent [19]

Polizzano, deceased et al.

[11] 4,083,484

[45] Apr. 11, 1978

[54] PROCESS AND APPARATUS FOR MANUFACTURING FLEXIBLE SHIELDED COAXIAL CABLE

[75] Inventors: Fred F. Polizzano, deceased, late of Allendale, N.J., by Anita Polizzano, executrix; Dimitri R. Stein, Larchmont, N.Y.; Gerhard Ziemek, Hannover, Germany

[73] Assignee: Kabel-und Metallwerke Gutehoffnungshutte AG, Germany

[21] Appl. No.: 525,184

[22] Filed: Nov. 19, 1974

[51] Int. Cl.$^2$ ........................ H01B 13/22; B23K 31/02

[52] U.S. Cl. ........................................ 228/130; 29/624; 174/106 D; 228/148; 228/155; 228/187

[58] Field of Search ................. 29/474.1, 473.3, 473.5, 29/473.9, 475, 477, 477.3, 477.7, 624; 228/5, 7, 15, 16, 17, 130, 148, 173 D, 155, 176, 179, 187; 113/116 UT; 174/106 D

[56] References Cited

U.S. PATENT DOCUMENTS

| | | | |
|---|---|---|---|
| 2,525,300 | 10/1950 | Jones | 228/148 X |
| 3,360,409 | 12/1967 | Jachimowicz | 228/130 |
| 3,405,228 | 10/1968 | Polizzano | 29/474.1 X |
| 3,452,434 | 7/1969 | Wagele | 29/624 |
| 3,807,031 | 4/1974 | Jachimowicz | 29/474.1 X |
| 3,941,296 | 3/1976 | Ziemek | 228/148 |

*Primary Examiner*—Al Lawrence Smith
*Assistant Examiner*—K. J. Ramsey
*Attorney, Agent, or Firm*—Marn & Jangarathis

[57] ABSTRACT

There is disclosed a process and apparatus for manufacturing flexible, shielded coaxial cable exhibiting improved magnetical screening capabilities wherein a tubular outer conductor is concentrically formed about an inner conductor with spacer means being disposed in the annulus between conductors. Accordingly, about the inner conductor including spacer means therefore, there is formed an inner component tube of a conductive material by the continuous forming in a lengthwise direction of a metal band into a tube having longitudinal edges welded together in a continuous, longitudinal welded joint. Concurrently, at least one further component tube is formed concentrically about the inner component tube by the lengthwise deformation of a second metal band of a ferromagnetic material into a second tube having opposed longitudinal edges which are also welded in a longitudinal direction in a continuous, longitudinal welded joint.

15 Claims, 5 Drawing Figures

PROCESS AND APPARATUS FOR MANUFACTURING FLEXIBLE SHIELDED COAXIAL CABLE

BACKGROUND OF THE INVENTION

This invention relates to techniques for the manufacturing of flexible coaxial cable exhibiting excellent electromagnetic screening capabilities and more particularly to a process and apparatus for manufacturing coaxial cable comprised of a plurality of thin walled layers concentrically formed about an inner conductor including spacing means with the resulting assembly being subsequently corrugated.

Coaxial cables are combined in great number into a single cable for long distance communication for transmitting communication signals in a frequency range up to 60 Mhz. A ferromagnetic sheathing is normally provided to magnetically screen proximate cables to obtain excellent cross talk attenuation. According to present day cable manufacturing techniques, the sheath is formed from two layers of the ferromagnetic material wound in opposite directions about the outer conductor of the coaxial cable. Such method is expensive and results in a coaxial cable of inferior electromagnetic screening abilities due to the air space between individual windings of the layers of the ferromagnetic material.

Therefore it is a principle object of the instant invention to provide a process and apparatus for manufacturing in a facile manner coaxial cable exhibiting improved screening capabilities.

SUMMARY OF THE INVENTION

This and other objects of the instant invention are achieved by concentrically forming about an inner conductor having spacers disposed thereon a plurality of metal tubes with the inner tube formed of a conductive material and the outer tube formed of a ferromagnetic material. The resultant structure is corrugated generally in a transverse-axial direction to render the resultant structure formed flexible. In a preferred embodiment of the instant invention, after forming the outer tube, the resultant structure is immediately drawn down to a desired diameter prior to corrugation should the outer tube not be initially formed tightly about the inner tube. Thus, coaxial cable made in accordance with the teachings of the instant invention exhibits magnetic screening which is effective for a wide frequency range and is flexible so that it may be wound upon take-up reels and hence produced according to continuous or endless manufacturing techniques.

BRIEF DESCRIPTION OF THE DRAWINGS

The invention will be more clearly understood by reference to the following detailed description of an exemplary embodiment thereof, in conjunction with the accompanying drawings in which.

DETAILED DESCRIPTION OF THE INVENTION

Figure 1:
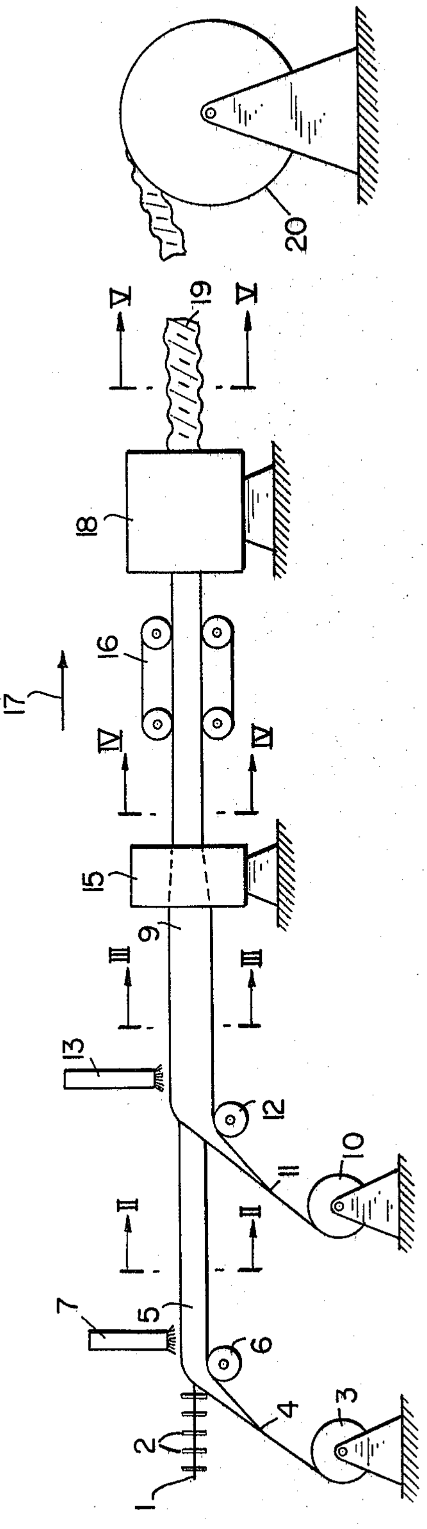
FIG. 1 schematically illustrates an exemplary embodiment for the manufacture of extended lengths of flexible metal tubing capable of withstanding substantial pressures in accordance with the teachings of the instant invention.

Referring now to the drawings and more particularly to FIG. 1 thereof, there is schematically illustrated an exemplary embodiment for manufacturing flexible coaxial cable in extended lengths, which coaxial cable exhibits highly improved magnetic screening capabilities. The equipments illustrated in FIG. 1 comprise first and second supply rolls 3 and 10 upon which flat metal material in the form of bands 4 and 11 are wound, shaping stations 6 and 12 each comprising shaping elements, not shown, capable of progressively forming the metallic material into a tubular configuration in a lengthwise direction, welding stations 7 and 13, transport station 16, a reduction station 15, a corrugation station 18, and a take-up reel 20 upon which the corrugated cable formed may be wound. As illustrated in FIG. 1, the exemplary process for the formation of extended lengths of flexible coaxial cable initially functions to form an inner tube 5 of a conductive material about an inner conductor 1 having spacers 2 disposed thereon. The inner tube 5 is formed through the continuous processing techniques illustrated in FIG. 1 by the removal of the metal band of a conductive material 4 wound on the first supply roll 3 and the shaping of the same into a tubular tube configuration at the shaping station 6. The shaping station 6 may employ, as illustrated, conventional roller deformation techniques so that the metal band 4 is deformed into a tube configuration having adjoining edges disposed in an appropriate position for subsequent welding. The thin walled tube as thus formed about the inner conductor 1 at the shaping station 6 is then passed through the welding station 7 wherein adjoining edges of the tube are welded together. Thereafter, the finished inner tube 5 is displaced through the operation of known transport mechanisms, not shown, in the direction indicated by the arrow 17.

At a subsequent point, a second thin walled metal tube 9 of a ferromagnetic material is concentrically formed about the tube 5. This is achieved in the same manner employed in the formation of the inner thin walled tube 5. More particularly, a metal band 11 formed of a ferromagnetic material is pulled from the second supply roll 10 and deformed into a tubular configuration by shaping station 12 which again may employ conventional deformation techniques so that a second tube 9 is formed about the inner tube 5. After the tube configuration is estabilshed, the tube is welded at the welding station 13 so that a pair of concentrically formed tubes are formed using continuous processing techniques. The second tube 9, as initially formed is dimensioned larger than the inner tube 5 to facilitate welding. As hereinabove mentioned, in a preferred embodiment of the instant invention, immediately subsequent to the processing carried out at the welding station 13, the diameter of the second tube is reduced, through conventional drawing techniques or the like at the reduction station 15, should the outer tube 9 be insufficiently tight about the inner tube 5. Regardless of the inclusion of a reduction station, the combined assembly is further displaced in the direction indicated by the arrow 17 by the transport station 16 which acts, in this case, to guide the composite tubular structure formed into the corrugating station 18 at which stage both component tubes thereof are provided with a common transverse corrugation. The reduction station 15, if any, should be closely positioned with respect to the welding station 13 so that the reduction in the diameter of the outer tube 9 is quickly achieved subsequent to the formation thereof.

Figure 5:
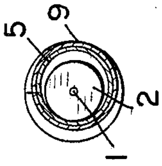
FIG. 5 is a cross section of electric cabling manufactured in accordance with the teachings of the instant invention taken along the lines V—V of FIG. 1.

The conventional corrugating station 18 acts to provide both tubes with a common corrugation run in a transverse axial direction as shown in FIG. 5 so that a dual walled, corrugated metal tube 19 is formed and may subsequently be wound on the take-up reel 20, the capacity of which may be considered to control the continuous length of the tubing formed although a plurality of commonly connected reels may be instead employed to further increase the lengths of continuous tubing which may be manufactured. If required, an extruder may be positioned subsequent to the corrugating station 18 to apply a plastic coating such as polyvinylchloride to the outer portion of the tubing formed. To prevent intercorrosion between individual component lengths of the finished tubing formed, provisions would be preferably made for corrosion proofing the surface of each tube formed and/or the ends of each component tube to be joined to a subsequent section.

Figure 2:
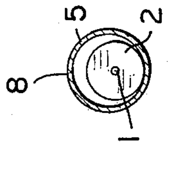
FIG. 2 is a cross section of electric cabling manufactured in accordance with the teachings of the instant invention taken along the lines II—II of FIG. 1.
Figure 3:
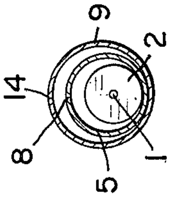
FIG. 3 is a cross section of electric cabling manufactured in accordance with the teachings of the instant invention taken along the lines III—III of FIG. 1.
Figure 4:
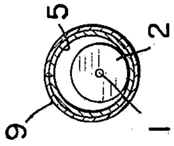
FIG. 4 is a cross section of electric cabling manufactured in accordance with the teachings of the instant invention taken along the lines IV—IV of FIG. 1.

The compressibility rating of the resultant flexible metal tubing 19 formed in accordance with the teachings of the instant invention, is a function of the tubings total wall thickness and, as such, the thickness of each of the individual component tubes. Therefore, as will be readily appreciated by those of ordinary skill in the art, the number and thickness of each of the component tubes employed to form the resulting structure may vary accordingly to meet particular requirements. Although only a two component tube structure has been illustrated in FIG. 1, it will be appreciated by those of ordinary skill in the art, that additional component tubes would be formed in precisely the same manner illustrated for the component tube 9 by the insertion of additional tube forming component stages, such as that described in conjunction with outer tube 9. Thus, additional tube forming stages may be accommodated by employing the continuous processing techniques according to the instant invention without a substantial increase in the space required for single operating stages. A cross section of the coaxial cable structure formed by the exemplary processing techniques according to the instant invention as detailed in conjunction with FIG. 1, is illustrated, in FIG. 5 and it will be apparent upon a review of FIG. 2 that the resulting tubular structure exhibits a flexible characteristic and hence may be made according to the continuous processing operations described.

While the use of disk spacer elements have been described with reference to FIG. 1, it will be understood by one skilled in the art, that other suitable distance spacers may be used about the inner conductor, e.g., a helical distance spacer. Additionally, it will be appreciated that an expanded polymer or solid dielectric material may be used as a distance spacer means. Further, if the coaxial cable is to be water tight in a longitudinal direction, the outer surface of the outer conductor may be provided with a suitable bonding material on which is disposed distance spacers prior to formation of the ferromagnetic screening tube. If desireable, the outer surface of the spacer elements may be provided with a bonding material prior to formation of the outer screening tube. Still further, the outer surface of the outer tube may be provided with a bonding material prior to the formation of the outer ferromagnetic tube in which event a heating zone would be appropriately positioned on the apparatus together with a corrugating station capable of forming parallel corrugations to form thereby annular closed chambers.

While the invention has been described in conjunction with a single exemplary embodiment thereof, it will be understood that many modifications will be readily apparent to those of ordinary skill in the art; and that this application is intended to cover any adaptations or variations thereof. Therefore, it is manifestly intended that this invention be limited only by the claims and the equivalents thereof.

What is claimed is:

1. A process for manufacturing flexible, shielded coaxial cable formed of a plurality of tubular members exhibiting improved screening capabilities, comprising the steps of:

continuously deforming about an inner conductor provided with spacer means a first metal band in a longitudinal direction into a first tubular member, said first metal band being formed of a conductive material;

continuously welding the longitudinal edges of said first tubular member to form a first tubular member having a longitudinally welded seam;

deforming at least a second metal band in a longitudinal direction concentrically about said longitudinally welded first tubular member to form a second tubular member concentrically about said first tubular member, said second metal band being formed of ferromagnetic material;

continuously welding the longitudinal edges of said second tubular member to form a second tubular member having a longitudinally welded seam; and corrugating both said first and second welded tubular members in a transverse axial direction to provide a common transverse corrugation by corrugating said second welded tubular member into said first welded tubular member to form a dual walled, corrugated metal tube from said first and second welded tubular members.

2. The process as defined in claim 1 wherein the diameter of said second tubular member is reduced prior to corrugation.

3. The process according to claim 2 wherein said step of reducing is accomplished by drawing down said second tubular member.

4. The process according to claim 3 additionally comprising the step of forming a plastic sheathing about the metal cable formed.

5. The process according to claim 3 additionally comprising the step of applying a corrosion proof coating to each tubular member prior to the formation of a succeeding tubular member thereabout.

6. The process according to claim 5 additionally comprising the step of forming a plastic sheathing about the metal cable formed.

7. The process according to claim 1 additionally comprising the step of applying a corrosion proof coating to each tubular member prior to the formation of a succeeding tubular member thereabout.

8. The process according to claim 1 additionally comprising the step of forming a plastic sheathing about the metal cable formed.

9. The metal tubing formed by the process of claim 1.

10. The process according to claim 1 wherein said first tubular member is formed concentrically about spacer means comprised of disks.

11. The cable formed by the process of claim 10.

12. A process for manufacturing flexible, shielded coaxial cable formed of a plurality of tubular members exhibiting improved screening capabilities, comprising the steps of:

continuously deforming about an inner conductor provided with spacer means a first metal band in a longitudinal direction into a first tubular member, said first metal band being formed of a conductive material;

continuously welding the longitudinal edges of said first tubular member to form a first tubular member having a longitudinally welded seam;

applying a bonding material about said first welded tubular member;

deforming at least a second metal band in a longitudinal direction concentrically about said longitudinally welded first tubular member to form a second tubular member concentrically about said first tubular member, said second metal band being formed of a ferromagnetic material;

continuously welding the longitudinal edges of said second tubular member to form a second tubular member having a longitudinally welded seam;

heating said second welded tubular member and bonding material encompassed thereby; and corrugating both said first and second welded tubular members in a transverse axial direction to provide a common transverse corrugation by corrugating said second welded tubular member into said first welded tubular member to form a dual walled, corrugated metal tube from said first and second welded tubular members.

13. A process for manufacturing flexible, shielded coaxial cable formed of a plurality of tubular members exhibiting improved screening capabilities, comprising the steps of:

continuously deforming about an inner conductor provided with spacer means a first metal band in a longitudinal direction into a first tubular member, said first metal band being formed of a conductive material;

continuously welding the longitudinal edges of said first tubular member to form a first tubular member having a longitudinally welded seam;

applying a bonding material about said first welded tubular member and positioning a spacer means on said bonding material;

deforming at least a second metal band in a longitudinal direction concentrically about said longitudinally welded first tubular member to form a second tubular member concentrically about said first tubular member, said second metal band being formed of a ferromagnetic material;

continuously welding the longitudinal edges of said second tubular member to form a second tubular member having a longitudinally welded seam; and corrugating both said first and second welded tubular members in a transverse axial direction to provide a common transverse corrugation by corrugating said second welded tubular member into said first welded tubular member to form a dual walled corrugated metal tube from said first and second welded tubular members.

14. The cable formed by the process of claim 12.

15. The cable formed by the process of claim 13.

* * * * *